United States Patent [19]
Karube et al.

[11] Patent Number: 5,136,136
[45] Date of Patent: Aug. 4, 1992

[54] LASER PROCESSING APPARATUS

[75] Inventors: Norio Karube, Machida; Takeji Arai; Kuniaki Fukaya, both of Yamanashi, all of Japan

[73] Assignee: Fanuc Ltd., Minamitsuru, Japan

[21] Appl. No.: 613,761
[22] PCT Filed: Apr. 18, 1990
[86] PCT No.: PCT/JP90/00515
§ 371 Date: Nov. 10, 1990
§ 102(e) Date: Nov. 10, 1990
[87] PCT Pub. No.: WO90/13390
PCT Pub. Date: Nov. 15, 1990

[30] Foreign Application Priority Data

May 8, 1989 [JP] Japan .................... 1-114370
May 8, 1989 [JP] Japan .................... 1-114371

[51] Int. Cl.⁵ .............................................. B23K 26/06
[52] U.S. Cl. ...................... 219/121.73; 219/121.74; 219/121.75
[58] Field of Search ............ 219/121.73, 121.74, 219/121.75

[56] References Cited

U.S. PATENT DOCUMENTS 3,588,439 5/1967 Heller ............................ 346/76
4,424,435 1/1984 Barnes, Jr. ................. 219/121.64

*Primary Examiner*—C. L. Albritton
*Attorney, Agent, or Firm*—Staas & Halsey

[57] ABSTRACT

A laser processing apparatus including a laser oscillator, a beam expander, and a light converging system. An output-end-side optical component formed by the beam expander and the light converging system includes one light converging system having composite characteristics of the optical component and the light converging system. Accordingly, the number of lenses used is reduced, the absorption loss of the laser output is lowered, and the number of parts used is reduced. Also disclosed is a laser processing apparatus in which an optical component forming a beam expander is formed partially of an output coupling mirror of the laser oscillator, whereby the number of lenses used is reduced.

16 Claims, 8 Drawing Sheets

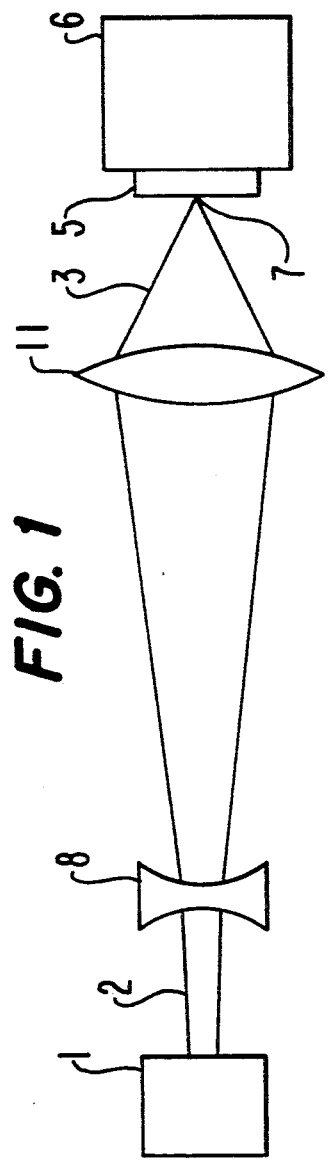
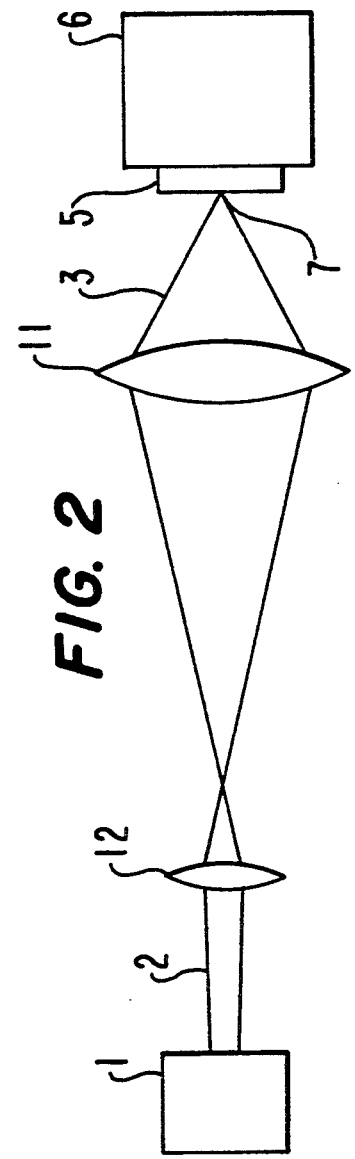

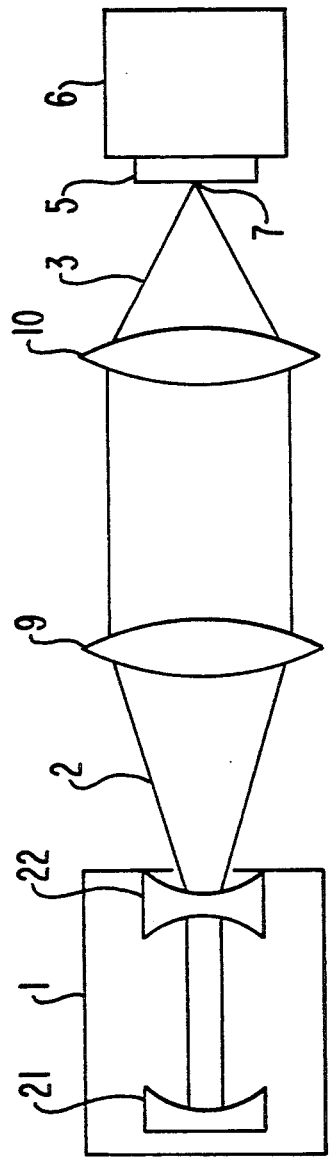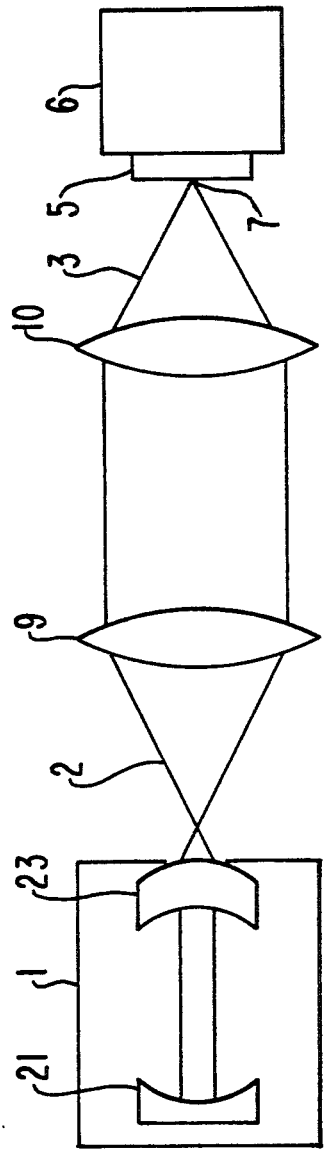

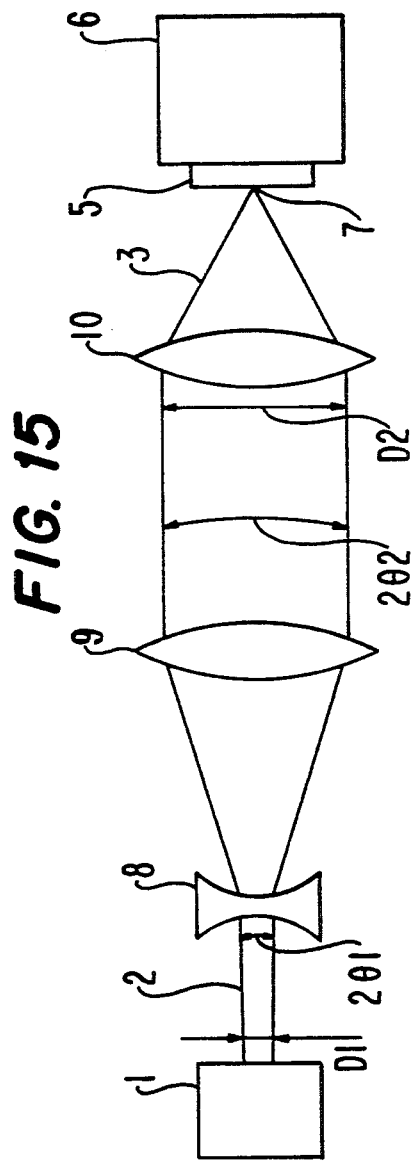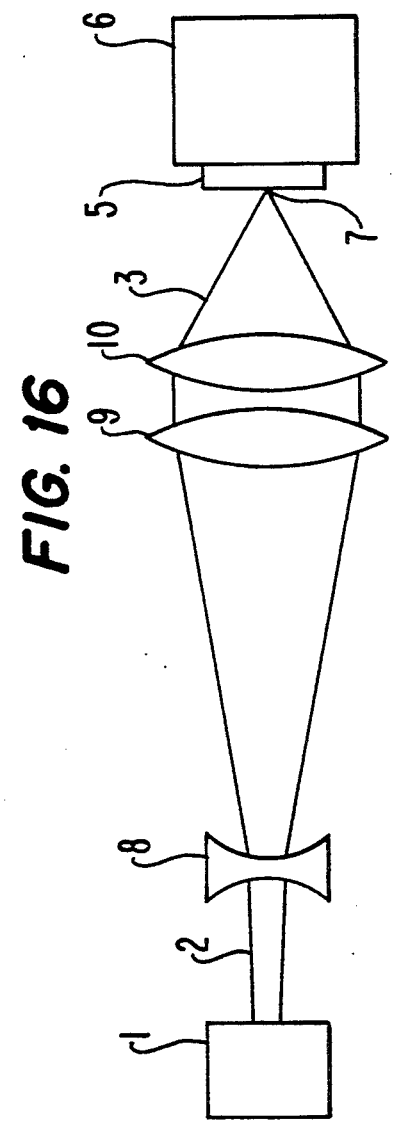

LASER PROCESSING APPARATUS

BACKGROUND OF THE INVENTION

The present invention relates to a laser processing apparatus, and more particularly, to a laser processing apparatus having an improved optical system for transmitting a laser beam from a laser oscillator to a workpiece.

FIG. 14 is a diagram of an outline of a conventional laser processing apparatus. This diagram has been simplified and merely illustrates the arrangement of the laser processing apparatus. As shown in the figure, a laser beam 2 emitted from a laser oscillator 1 is converted into a converged beam 3 by a converging lens 4, and this converged beam 3 is converged to a focus 7 on a workpiece 5. The workpiece 5 is set on a worktable 6. The position of the worktable 6 is controlled in such a manner that the finished workpiece 5 has a desired shape.

As shown in FIG. 14, the laser beam 2 emitted from the laser oscillator 1 has a divergence angle of $2\theta$.

If the focal distance of the converging lens 4 is f, the diameter of the spot on the focus 7 obtained when the laser beam 2 is converged is $2f\theta$. To improve the machining accuracy, however, the spot diameter should be minimized, and thus the machining accuracy can be improved by reducing the focal distance f or the divergence angle $\theta$.

If the focal distance f is shortened, however, the spherical aberration is increased, and the focal depth is lessened. In general, therefore, it is not advisable to shorten the focal distance f.

Accordingly, an optimum reduction of the spot diameter is obtained by narrowing the divergence angle $\theta$, and various methods are used to this end. The following is a description of those methods.

The divergence angle $\theta$ is generally given by $$\theta = 2\lambda C_{mn}/\pi D, \quad (1)$$

where $\lambda$ is the wavelength, $C_{mn}$ is a constant dependent on the mode, and D is the oscillator output aperture diameter.

A first method used to narrow the divergence angle is that in which the TEM00 mode is used to adjust $C_{mn}$ to a minimum value 1. This method has a drawback in that the output is reduced.

According to a second method, the oscillator output aperture diameter D is enlarged. This method is inconsistent with the aforesaid requirement for the use of the TEM00 mode.

A third method uses a beam expander to eliminate the drawbacks of the foregoing two methods. FIG. 15 is a diagram illustrating the use of a beam expander as a means of reducing the spot diameter.

According to this third method, a laser beam 2 in the TEM00 mode and having a small diameter D1 is emitted from a laser oscillator 1. This laser beam 2 is converted into a beam having a large diameter D2 and a narrow divergence angle, using a combination of two lenses, i.e., by using a beam expander composed of a concave lens 8 and a convex lens 9. This beam expander converts the laser beam having the small diameter D1 into a laser beam having the large diameter D2. It further, reduces a divergence angle $2\theta1$ to a divergence angle $2\theta2$.

Since the divergence angle $\theta$ is inversely proportional to the laser beam diameter D, as is evident from equation (1), the following equation can be obtained if "1" and "2" are suffixed to the respective constants of the individual laser beams before and after the passage through the beam expander.

$$\theta2 = (D1/D2)\theta1. \quad (2)$$

Even though the focal distance f of the converging lens 10 is long, the spot diameter at the focus can be made small enough by narrowing the divergence angle $\theta2$ of the laser beam after the passage thereof through the beam expander.

This method, however, has the following drawbacks. First, the beam expander is expensive, and second, the passage of the laser beam through the beam expander causes an absorption of the laser output. That is, the use of the beam expander leads to an increase in the number of lenses used, which results in increased costs and the need for an augmented laser output absorption.

SUMMARY OF THE INVENTION

The present invention has been developed in consideration of the above-mentioned drawbacks of the prior art. An object of the present invention is to provide a laser processing apparatus at no increase in cost and having an improved light converging characteristic, and capable of preventing a lowering of the laser output, thereby ensuring a stable and higher machining accuracy.

To solve the above prior art problems the present invention provides a laser processing apparatus comprising at least a laser oscillator, a beam expander, and a light converging system. The light converging system includes an output-end-side optical component forming the beam expander and the light converging system is formed by one light converging system having composite characteristics of the optical component and the light converging system.

The aforementioned drawbacks peculiar to the use of the beam expander are attributable to an increase in the number of lenses used, and therefore, these drawbacks can be eliminated by reducing the number of lenses forming the beam expander. Currently available beam expanders, however, all consist of two lenses. Thus, it is practically difficult to reduce the number of lenses to one.

Accordingly, the inventors carried out experiments, and as a result, found that the light converging characteristic of the converging lens 10 of FIG. 15 is not adversely influenced if the distance between the convex lenses 9 and 10 is made extremely short, as shown in FIG. 16. This is because the laser beam transmitted through the beam expander (convex lens 9) remains a parallel beam before reaching the converging lens 10. Accordingly, when the distance between the convex lens 9 and the converging lens 10 was further reduced to zero, i.e., when these two lenses were replaced with one converging lens as shown in FIG. 1, the light converging characteristic of the converging lens was not influenced thereby as in the case of FIG. 16.

According to the present invention, therefore, the output-end-side optical component of the beam expander and the light converging system are formed by one light converging system having composite characteristics thereof, to thereby reduce the number of beam expander lenses. Accordingly, the number of lenses can be reduced by at least one, and thus the object of the present invention can be achieved.

Also, there is provided a laser processing apparatus comprising at least a laser oscillator, a beam expander, and a light converging system. including an optical component forming the beam expander is formed partially of an output coupling mirror of the laser oscillator.

In the same way, to reduce the number of lenses, the optical component forming the beam expander is formed partially of the output coupling mirror of the laser oscillator, and accordingly, the number of lenses can be reduced by at least one. As preferred embodiment of the present invention, the output-end-side optical component of the beam expander and the light converging system is replaced with one light converging system having composite characteristics thereof. Thus, the number of lenses can be further reduced by one.

BRIEF DESCRIPTION OF THE DRAWINGS

FIG. 1 is a diagram of a first embodiment according to the present invention, using a Galilean expander;

FIG. 2 is a diagram of a second embodiment according to the present invention, using a Keplerian expander;

FIG. 5 is a diagram of a fifth embodiment according to the present invention, using a Galilean expander;

FIG. 6 is a diagram of a sixth embodiment according to the present invention, using a Keplerian expander;

FIG. 15 is a diagram of a beam expander as a means of reducing the spot diameter; and FIG. 16 is a diagram of a modification of FIG. 15, to illustrate the function of the present invention.

DESCRIPTION OF THE PREFERRED EMBODIMENTS

Figure 3:
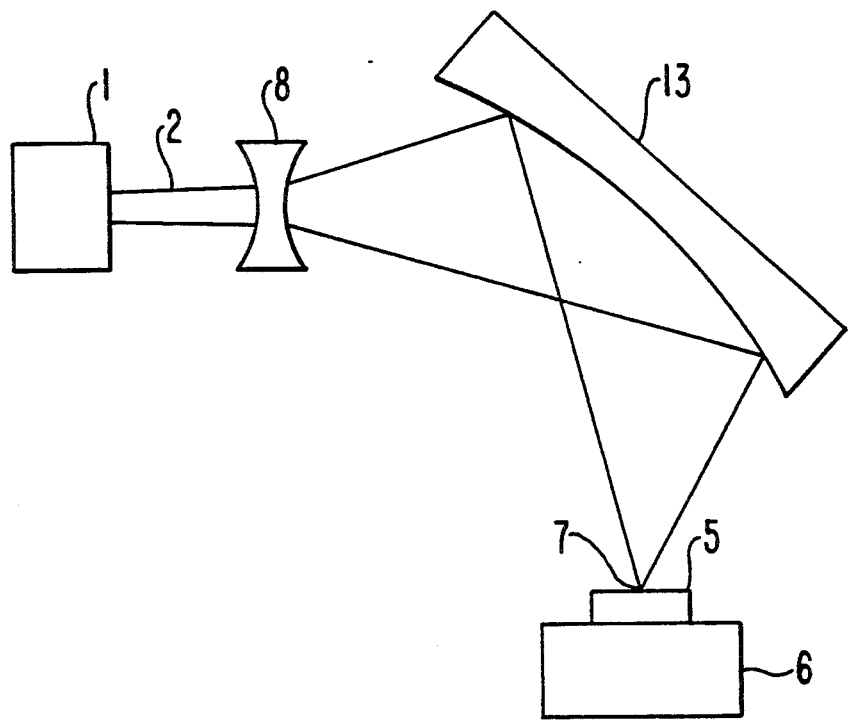
FIG. 3 is a diagram of a third embodiment according to the present invention, using a parabolic reflector as a part of a beam expander.

Embodiments of the present invention will now be described with reference to the drawings.

FIG. 1 is a diagram of a first embodiment according to the present invention using a Galilean expander. Like reference numerals refer to the same components as those shown in FIG. 16, and therefore a description of those components is omitted.

The present embodiment is arranged such that the distance between lenses 9 and 10 of FIG. 16 is reduced to zero, i.e., the convex lens 9 and the converging lens 10 are combined into one converging lens 11. Accordingly, the converging lens 11 of FIG. 1 has the composite characteristics of the convex lens 9 and the converging lens 10 of FIG. 16. The total number of lenses through which a laser beam is passed can be reduced by one, by replacing the two convex lenses 9 and 10 with the single convex lens 11 as in the present invention. Thus, the drawbacks attributable to the use of the beam expander can be eliminated, and the same total effect as provided by the use of the beam expander can be obtained. Thus, effect is substantial.

Further, the rate of the reduction of the divergence angle $\theta$ of the laser beam is proportional to the ratio between the respective focal distances of a concave lens 8 and the convex lens 11, and, is inversely proportional to the beam diameter ratio. Since the ratio of the beam divergence angle between the TEM00 and TEM01 modes is 2.25, a laser oscillator in the TEM01 mode can be used with the same machining characteristics as in the case of the TEM00 mode, if the ratio between the focal distances of the concave lens 8 and the convex lens 11 is adjusted to 2.25. This output coupling mirror can be designed by using conventional techniques, and thus a description thereof is omitted herein.

FIG. 2 is a diagram of a second embodiment of the present invention using a Keplerian expander. The second embodiment differs from the first embodiment shown in FIG. 1 in that a lens, forming a beam expander on the side of the laser oscillator 1, is a convex lens. This convex lens 12 and another convex lens 11 form the Keplerian expander. In this system, however, a laser beam emerging from the convex lens 12 is focused once. Therefore, this method should be applied to a medium-output laser rather than to a large-output laser for machining.

FIG. 3 is a diagram of a third embodiment according to the present invention, using a parabolic reflector 13 as a part of a beam expander. The third embodiment differs from the first embodiment shown in FIG. 1 in that the parabolic reflector 13 is used in place of the convex lens 11. The use of this parabolic reflector 13 enables the diameter of the laser beam to be enlarged without a spherical aberration. In addition, the optical component (parabolic reflector 13) can be easily cooled. Since the parabolic reflector is subject to a greater coma than that of a lens, however, the alignment thereof requires great care.

Figure 4:
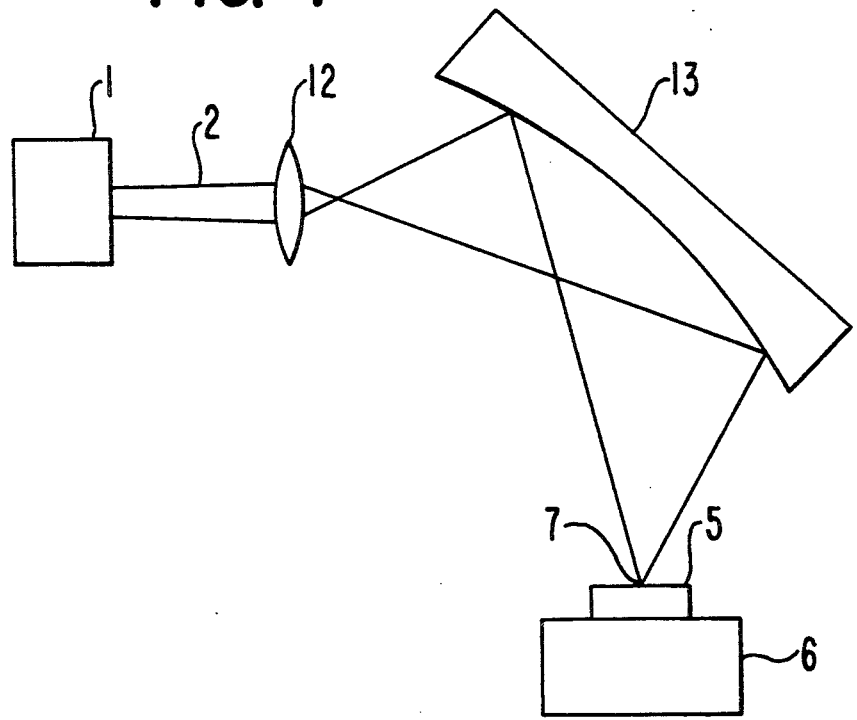
FIG. 4 is a diagram showing a fourth embodiment of the present invention as a modification of the embodiment shown in FIG. 3.

FIG. 4 is a diagram of a fourth embodiment according to the present invention, which is a modification of the third embodiment shown in FIG. 3. In the fourth embodiment, the beam expander comprises a convex lens 12 and the parabolic reflector 13. Also, in this embodiment, the laser beam is focused once, and thus this arrangement is best suited for a medium-output laser.

FIG. 5 is a diagram of a fifth embodiment according to the present invention, using a Galilean expander. As like reference numerals refer to the same components as those shown in FIG. 15, a description of those components is omitted.

A laser oscillator 1 is provided with a resonator composed of a total reflection mirror 21 and an output coupling mirror 22. In the fifth embodiment, a concave lens is used as the output coupling mirror 22. The output coupling mirror 22 and a convex lens form a beam expander resembling that shown in FIG. 15. Therefore, in this embodiment, the optical components (lenses) forming the beam expander include the output coupling mirror 22 in the laser oscillator 1. In contrast with the conventional unit, however, the number of lenses through which the laser beam is passed is reduced. Accordingly, there is less absorption of the laser output by the optical system, and thus the drawbacks attributable to the use of the beam expander are eliminated.

Further, the rate of reduction of the divergence angle $\theta$ of the laser beam is proportional to the ratio between the respective focal distances of the convex lens 9 and the concave lens 22, and, is inversely proportional to the beam diameter ratio. Since the ratio of the beam divergence angle between the TEM00 and TEM01 modes is 2.25, a laser oscillator in the TEM01 mode can be used with the same machining characteristics as in the case of the TEM00 mode, if the ratio between the focal distances of the concave lens of the output coupling mirror 22 and the convex lens 9 is adjusted to 2.25. This output coupling mirror can be designed by using conventional techniques, and thus a description thereof is omitted herein.

FIG. 6 is a diagram of a sixth embodiment according to the present invention, using a Keplerian expander. This sixth embodiment differs from the fifth embodiment shown in FIG. 5 in that the output surface of an output coupling mirror 23 of a resonator is formed by a convex lens. The output coupling mirror 23 and the convex lens 9 form the Keplerian expander. In this system, however, a laser beam emerging from the output coupling mirror 23 is focused once, and therefore, this method should be applied to a medium-output laser rather than to a large-output laser for machining.

Figure 7:
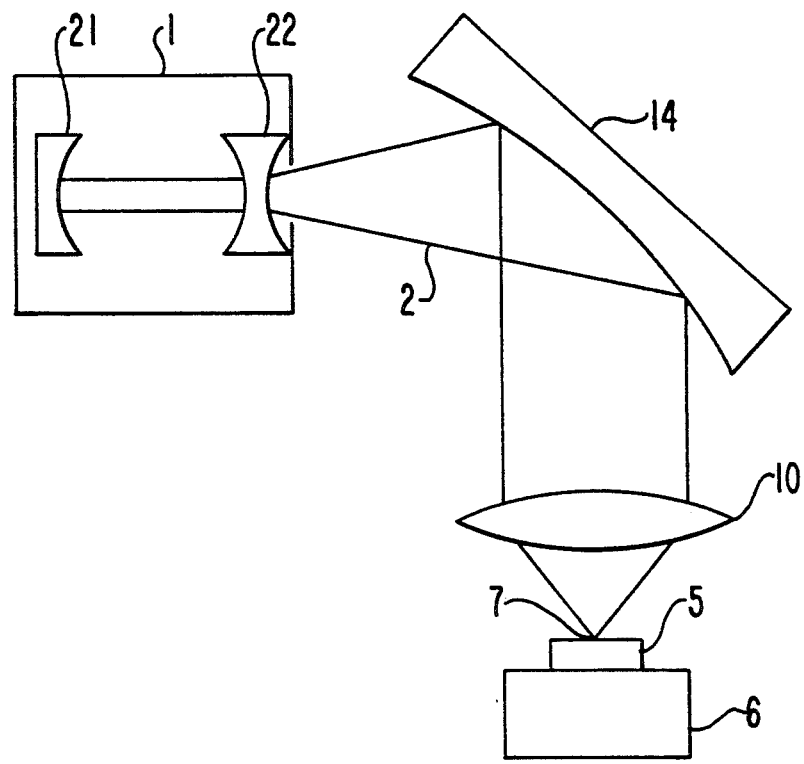
FIG. 7 is a diagram of a seventh embodiment according to the present invention, using a parabolic reflector as a part of a beam expander.

FIG. 7 is a diagram up a seventh embodiment according to the present invention, wherein a parabolic reflector 14 is used as a part of the beam expander. This seventh embodiment differs from the fifth embodiment shown in FIG. 5 in that the parabolic reflector 14 is used in place of the convex lens 9. The use of the parabolic reflector 14 enables the diameter of the laser beam to be enlarged without a spherical aberration. Moreover, the optical component (parabolic reflector 14) can be easily cooled. Since the parabolic reflector is subject to a greater coma than that of a lens, however, the alignment thereof requires great care.

Figure 8:
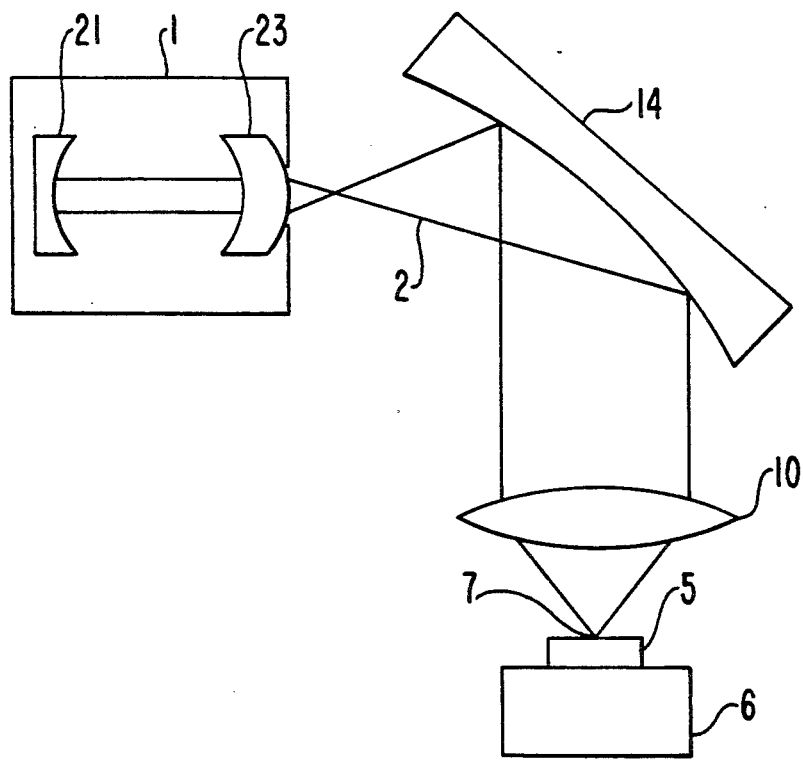
FIG. 8 is a diagram of an eighth embodiment according to the present invention, as a modification of the embodiment shown in FIG. 7.

FIG. 8 is a diagram of an eighth embodiment according to the present invention, as a modification of the seventh embodiment shown in FIG. 7. In the eighth embodiment, the beam expander of the convex lens comprises an output coupling mirror 23 and the parabolic reflector 14. Also, in this embodiment, the laser beam is focused once, and thus this arrangements is best suited for a medium-output laser.

Figure 9:
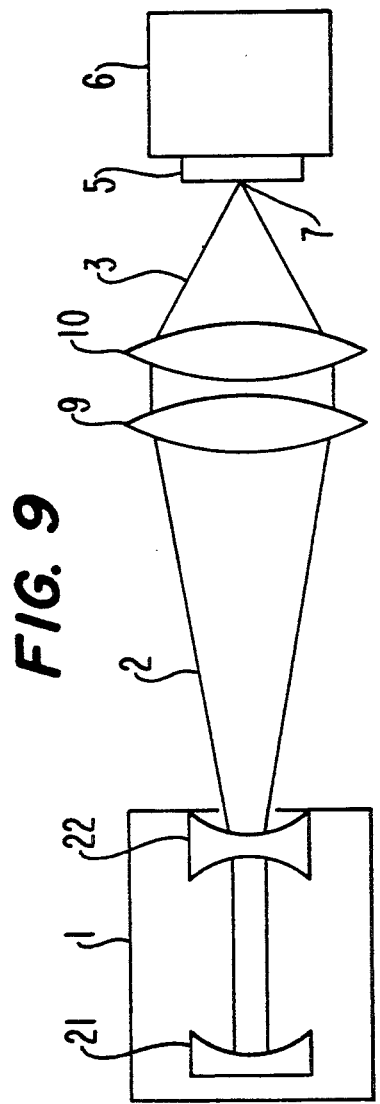
FIG. 9 is a diagram of a ninth embodiment according to the present invention, as a modification of the embodiment shown in FIG. 5.

FIG. 9 is a diagram of a ninth embodiment according to fifth present invention, as a modification of the embodiment shown in FIG. 5. In the ninth embodiment, the distance between the convex lens 9 and a converging lens 10 is made extremely short. Nevertheless, the light converging characteristic of the converging lens 10 is not influenced by this reduction of the distance between the two lenses 9 and 10, because the laser beam transmitted through the beam expander (convex lens 9) remains a parallel beam before reaching the converging lens 10.

Figure 10:
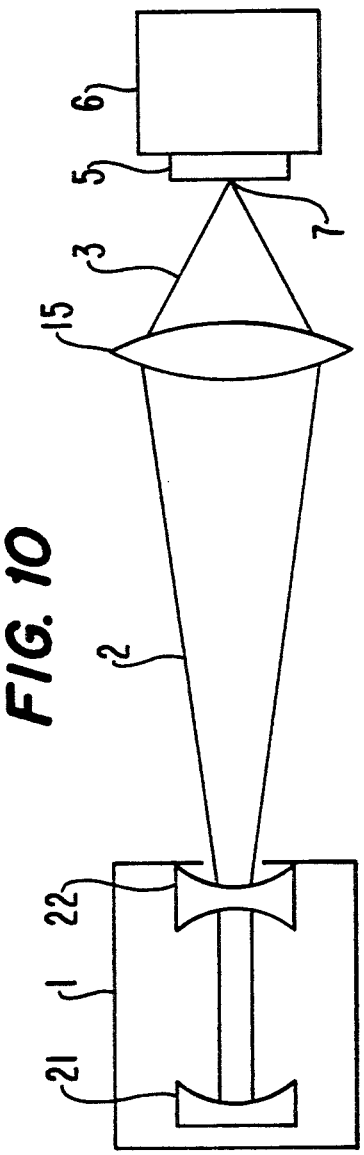
FIG. 10 is a diagram of a tenth embodiment according to the present invention, as a modification of the embodiment shown in FIG. 9.
Figure 14:
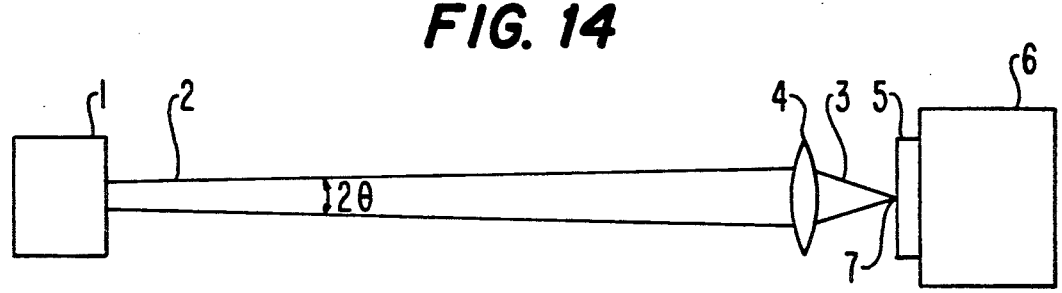
FIG. 14 is a diagram of an outline of a conventional laser processing apparatus.

FIG. 10 is a diagram of a tenth embodiment according to the present invention, as a modification of the ninth embodiment shown in FIG. 9. The tenth embodiment is arranged in such a manner that the distance between the lenses 9 and 10 of FIG. 9 is reduced to zero, i.e., the convex lens 9 and the converging lens 10 are combined to form one converging lens 15. Accordingly, the converging lens 15 of FIG. 10 has the composite characteristics of the convex lens 9 and the converging lens 10 of FIG. 9. The total number of lenses through which the laser beam is passed can be reduced by two by replacing the two convex lenses 9 and 10 with the single convex lens 15, as in this embodiment. This provides the same effect as that obtained by the arrangement of FIG. 14, which does not use a beam expander. Accordingly, the drawbacks attributable to the use of the beam expander can be eliminated, and the same total effect as provided by the use of the beam expander can be obtained.

Figure 11:
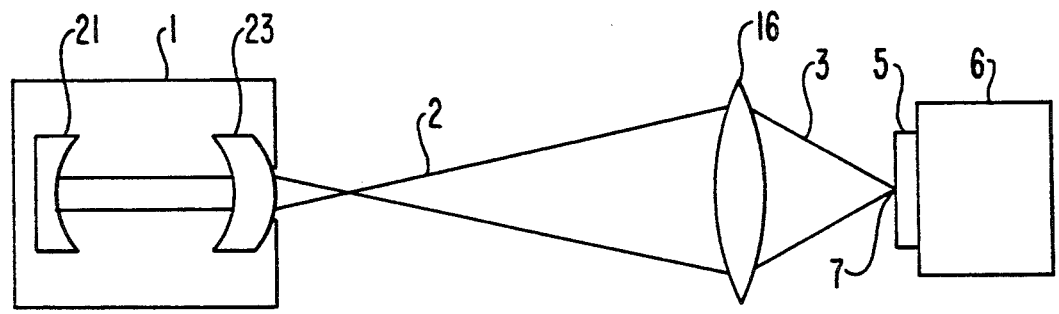
FIG. 11 is a diagram of an eleventh embodiment according to the present invention, as a modification of the embodiment shown in FIG. 10.

FIG. 11 is a diagram of an eleventh embodiment according to the present invention, as a modification of the tenth embodiment shown in FIG. 10. In the eleventh embodiment, the output surface of an output coupling mirror 23 of a resonator is formed by a convex lens 23, and the same improvement as obtained in the sixth embodiment shown in FIG. 6 is made. Accordingly, this embodiment produces the same effect as that shown in FIG. 10, provided that the laser beam is focused once.

Figure 12:
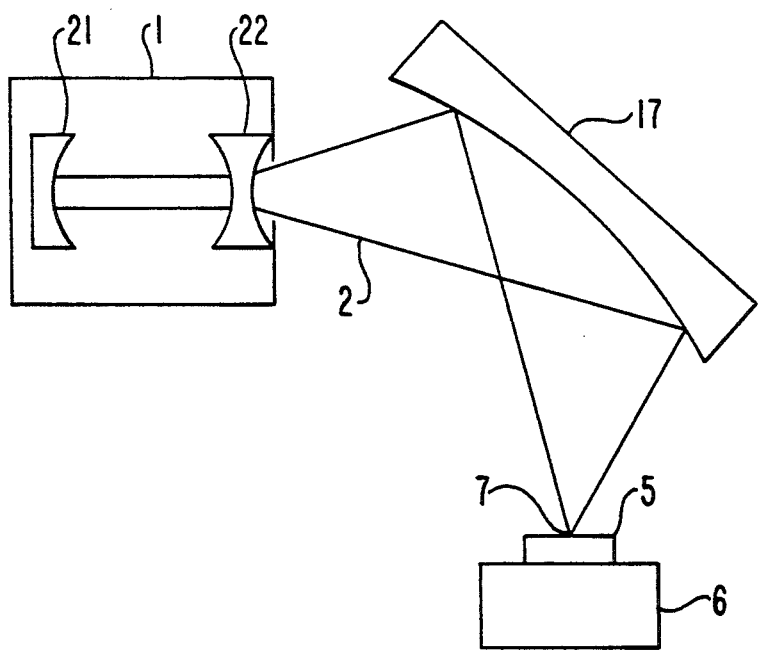
FIG. 12 is a diagram showing a twelfth embodiment of the present invention, as a modification of the embodiment shown in FIG. 7.

FIG. 12 is a diagram of a twelfth embodiment according to the present invention as a modification of the seventh embodiment shown in FIG. 7. In the twelfth embodiment, a parabolic reflector 17 is used as a part of the beam expander. The parabolic reflector 17 has the composite characteristics of the parabolic reflector 14 and the converging lens 10 of FIG. 7. According to this embodiment, the converging lens 10 is omitted. Moreover, the use of the parabolic reflector 17 enables the diameter of the laser beam to be enlarged without a spherical aberration, and the optical component (parabolic reflector 17) can be easily cooled. As in the case of FIG. 7, however, the parabolic reflector is subject to a greater coma than that of a lens, and thus the alignment thereof requires great care.

Figure 13:
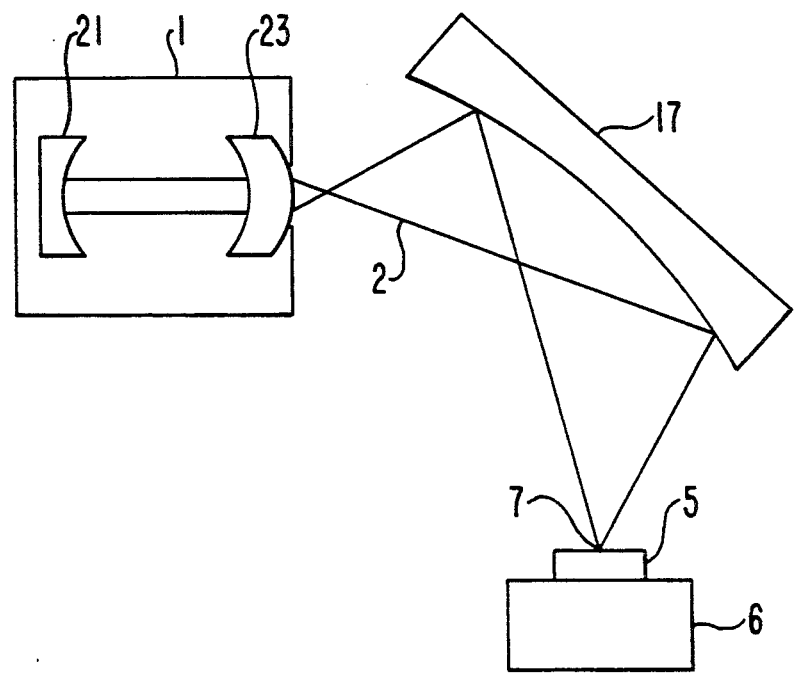
FIG. 13 is a diagram of a thirteenth embodiment according to the present invention, as a modification of the embodiment shown in FIG. 12.

FIG. 13 is a diagram of a thirteenth embodiment according to the present invention, as a modification of the twelfth embodiment shown in FIG. 12. In the thirteenth embodiment, the output surface of an output coupling mirror 23 of a resonator is formed by a convex lens. Thus, this embodiment produces the same effect as that shown in FIG. 12, provided that the laser beam is focused once.

The aforementioned embodiments are intended to improve the diffraction limit of the converging lens by enlarging the beam diameter. If beam diameter is increased, the influence of a spherical aberration due to the converging lens cannot be ignored. To lessen this influence, it is advisable to use a light converging system without a spherical aberration, e.g., a parabolic reflector or stigmatic lens, and thus, ideally the object of the present invention is achieved by using a parabolic reflector, as shown in FIGS. 3, 4, 7, 8, 12 and 13.

According to the present invention, as described above, there is provided a laser processing apparatus in which a beam diameter can be enlarged with a lower laser output absorption loss and at a lower cost than when a prior art beam expander is used. In this arrangement, the laser beam can be converged to a small spot, and thus the same characteristics for a laser machining process, such as cutting, welding, etc., in the TEM00 mode can be obtained, without using the TEM00 mode.

We claim:

1. A laser processing apparatus, comprising:
   a laser oscillator;
   a beam expander; and
   a light converging system, an output-end-side optical component forming the beam expander and the light converging system and being formed by one light converging system having composite characteristics of the optical component and said light converging system, said light converging system formed by a stigmatic lens.

2. A laser processing apparatus, comprising:
   a laser oscillator including an output coupling mirror;
   a beam expander formed by an optical component; and
   a light converging system, said optical component forming said beam expander is formed partially by said output coupling mirror.

3. A laser processing apparatus according to claim 2, wherein said beam expander comprises a Galilean expander such that an output surface of said output coupling mirror is formed by a concave lens.

4. A laser processing apparatus according to claim 2, wherein said beam expander comprises a Keplerian expander such that an output surface of said output coupling mirror is formed by a convex lens.

5. A laser processing apparatus according to claim 2, wherein said light converging system is formed by a stigmatic lens.

6. A laser processing apparatus according to claim 2, wherein said light converging system is formed by a parabolic reflector.

7. A laser processing apparatus according to claim 2, wherein an outer-side optical component of said beam expander and said light converging system include a light converging system having composite characteristics of said output-side optical component of said beam expander and said light converging system.

8. A laser processing apparatus according to claim 3, wherein said light converging system is formed by a stigmatic lens.

9. A laser processing apparatus according to claim 4, wherein said light converging system is formed by a stigmatic lens.

10. A laser processing apparatus according to claim 3, wherein said light converging system is formed by a parabolic reflector.

11. A laser processing apparatus according to claim 4, wherein said light converging system is formed by a parabolic reflector.

12. A laser processing apparatus according to claim 3, wherein an output-side optical component of said beam expander and said light converging system include a light converging system having composite characteristics of said output-side optical component of said beam expander and said light converging system.

13. A laser processing apparatus according to claim 4, wherein an output-side optical component of said beam expander and said light converging system include a light converging system having composite characteristics of said output-side optical component of said beam expander and said light converging system.

14. A laser processing apparatus according to claim 5, wherein an output-side optical component of said beam expander and said light converging system include a light converging system having composite characteristics of said output-side optical component of said beam expander and said light converging system.

15. A laser processing apparatus according to claim 6, wherein an output-side optical component of said beam expander and said light converging system include a light converging system having composite characteristics of said output-side optical component of said beam expander and said light converging system.

16. A laser processing apparatus, comprising:
    a laser oscillator;
    a beam expander; and
    a light converging system, an output-end-side optical component forming the beam expander and the light converging system and being formed by one light converging system having composite characteristics of the optical component and said light converging system, said light converging system formed by a parabolic reflector.

* * * * *